Oct. 17, 1950 B. B. GRAHAM 2,525,894
DOUBLE-ACTION GUIDE FOR MOLDING MACHINES
Filed July 28, 1948 2 Sheets-Sheet 1
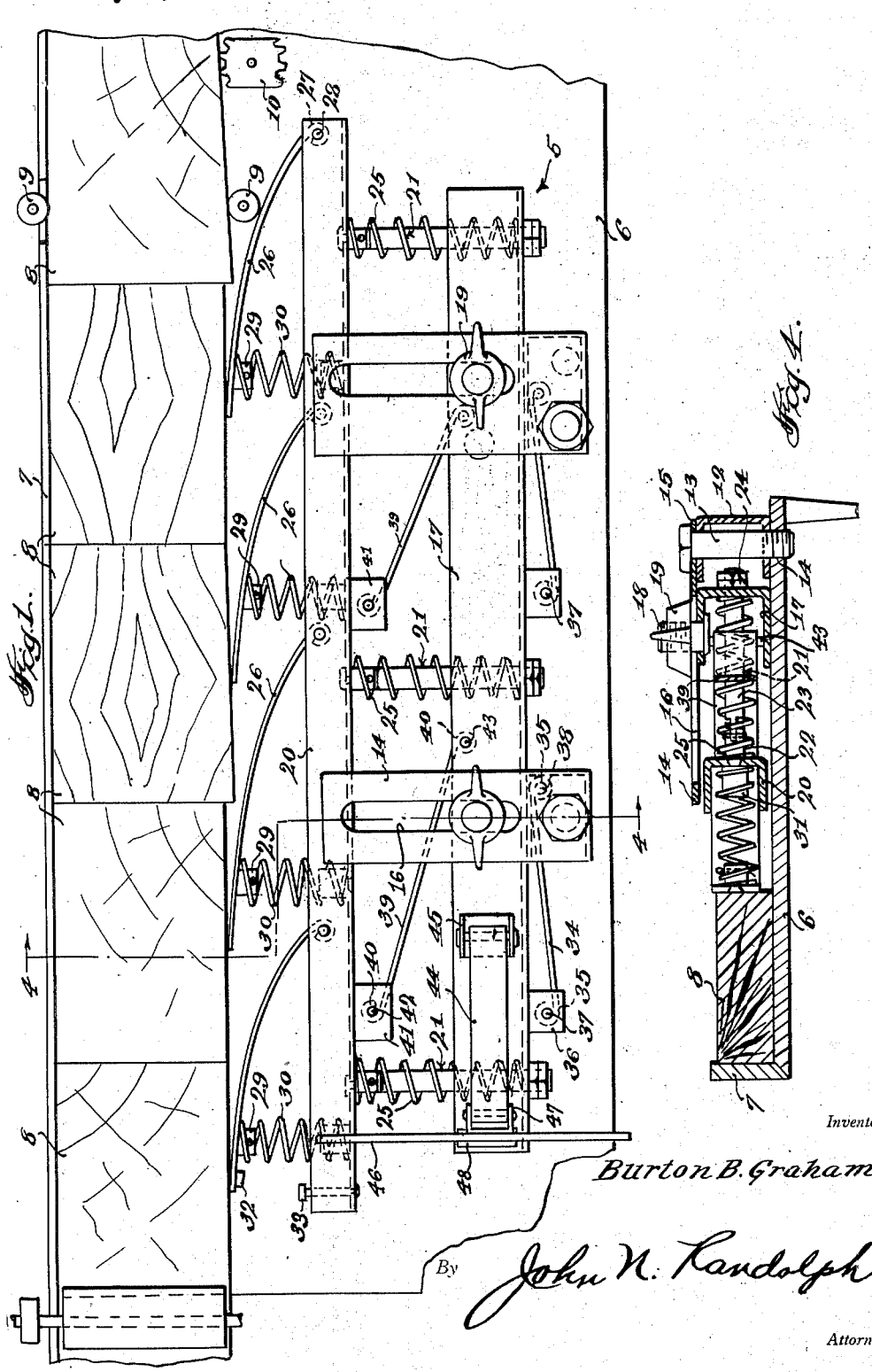
Inventor
Burton B. Graham
By John N. Randolph
Attorney Oct. 17, 1950    B. B. GRAHAM    2,525,894
DOUBLE-ACTION GUIDE FOR MOLDING MACHINES
Filed July 28, 1948    2 Sheets-Sheet 2
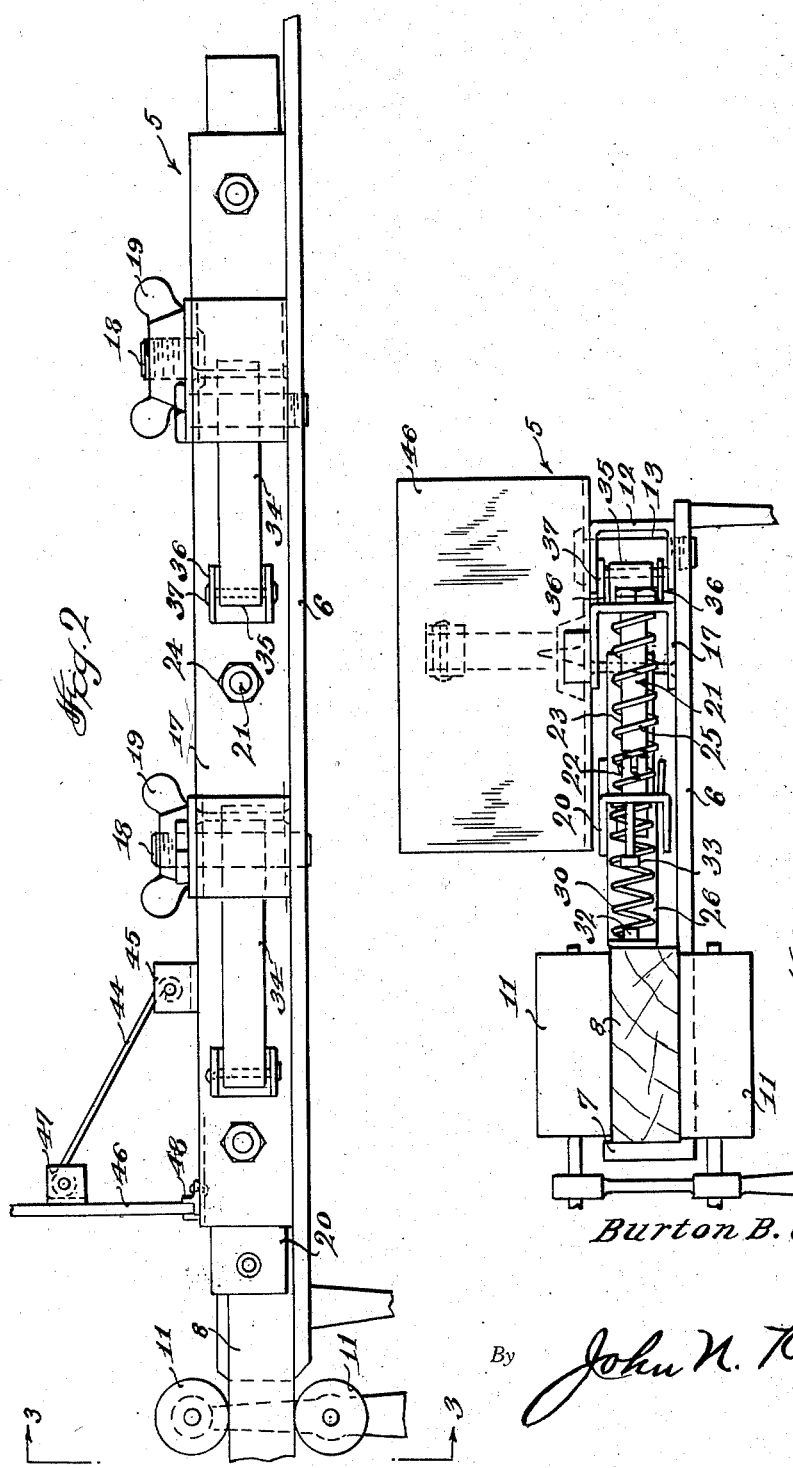
Inventor
Burton B. Graham
By John N. Randolph
Attorney Patented Oct. 17, 1950

2,525,894

UNITED STATES PATENT OFFICE 2,525,894

DOUBLE-ACTION GUIDE FOR MOLDING MACHINES

Burton B. Graham, Baker, Oreg.

Application July 28, 1948, Serial No. 41,137

5 Claims. (Cl. 144—253)

This invention relates to a guide attachment for molding machines of the type employed for feeding scrap or culls of lumber from a hopper to pattern knives which cut the scrap or culls into pieces of uniform size and shape and has for a primary object to provide an auxiliary double action guide capable of being quickly attached to or detached from a machine table over which the scrap lumber is conveyed for correctly positioning the corresponding longitudinal edges of each piece of lumber passing over the table against a guide rail so that pieces will be cut to uniform shape.

More particularly, it is an aim of the present invention to provide a readily adjustable guide attachment adapted to be detachably mounted on the top surface of a machine table and provided with a plurality of longitudinally spaced resilient guide elements arranged for engagement with each piece of the scrap lumber for holding a longitudinal edge of the lumber in engagement with the guide rail as it is conveyed across the table.

Still another object of the invention is to provide a guide attachment wherein the lumber engaging elements are disposed in overlapping relationship so that each piece of the lumber passing between the guide rail and said guide attachment will be engaged at all times by the attachment and yieldably held thereby in engagement with the guide rail.

Still a further object of the invention is to provide an attachment having means for yieldably urging a plurality of spring fingers as a unit toward the guide rail.

Still another object of the invention is to provide an attachment either end of which is capable of yielding away from the guide rail to compensate for variations in the size of the pieces of lumber passing therebetween and the guard rail.

Another object of the invention is to provide an attachment having adjustable clamping means for advancing or retracting the attachment relatively to the guard rail for accommodating the molding machine to scrap pieces of lumber of different widths.

Various other objects and advantages of the invention will hereinafter become more fully apparent from the following description of the drawings, illustrating a presently preferred embodiment thereof, and wherein:

Figure 1 is a top plan view showing the attachment applied to the top surface of a feed table and engaging a plurality of pieces of scrap lumber being conveyed longitudinally thereover;

Figure 2 is a side elevational view looking toward the outer side of the attachment or from the bottom to the top of Figure 1;

Figure 3 is an end elevational view of the attachment looking from left to right of Figures 1 and 2, and Figure 4 (Sheet 1) is a cross sectional view of the attachment taken substantially along a plane as indicated by the line 4—4 of Figure 1.

For the purpose of illustrating a preferred application and use of the guide attachment, constituting the invention and designated generally 5, a portion of a conventional rolling machine is illustrated including a table 6 to the top surface of which the attachment 5 is detachably and adjustably secured. The attachment 5 extends longitudinally of the table 6 and is disposed adjacent one longitudinal edge thereof. The opposite longitudinal edge of the table 6 is provided with an upstanding guide rail 7 for guiding a plurality of pieces of scrap lumber or culls 8 which are conveyed over the upper surface of the table 6 by suitably driven feed rollers 9 from a hopper, not shown, located to the right of Figure 1, past a kicker gear 10 which directs the pieces 8 from said hopper to the feed rollers 9. The molding machine may be provided with additional feed rollers, not shown, and is provided at the opposite, discharge end of the table 6 with machine rollers 11, 11 between which the pieces 8 are conveyed and which direct the pieces 8 to a pattern or shaping knife, not shown, located beyond the left-hand end of the table 6. The parts 6 to 11 constitute no part of the present invention but have been merely illustrated and briefly described to afford a better understanding of the double action guide 5 which functions to retain a complementary longitudinal edge of each cull or scrap piece 8 in engagement with the inner side of the guide rail 7 so that said edges of the pieces 8 will be aligned when the pieces reach the pattern or shaping knives to insure the cutting thereof into pieces of uniform shape cross sectionally.

The double action guide 5 includes a pair of channel members 12 which are disposed longitudinally of the table 6 and in alignment with one another and remote to the guide rail 7. The members 12 are detachably fixed to the upper side of the table 6 by bolts 13 which extend through the sides or flanges thereof and through threaded openings 14 in the table 6. An elongated guide plate 14 is supported at one end thereof on the upper flange of each channel member 12 and is secured thereto by the shank of a bolt 13 extending through an opening thereof designated 15, and so that said end of the guide plate 14 will be clamped by the bolt head to the upper flange of its channel 12. Each guide plate 14 is provided with an elongated, longitudinally extending slot 16 which extends transversely of the table 6.

An elongated bar 17 of channel-shape cross section is disposed longitudinally of the table 6 with one side flange thereof resting thereon so that the channel bar 17 opens toward the guide rail 7. The bar 17 is disposed inwardly of and adjacent the channel members 12 and has threaded bolts 18 extending upwardly through the top flange thereof and loosely through the slots 16. Each bolt 18 carries a wing nut 19 which is adapted to bear upon the upper side of the guide plate 14 with which it is associated and so that by tightening the wing nuts 19 the channel bar 17 will be clamped to the guide plates 14 and thereby adjustably positioned relatively to the table top 6 so that said channel bar may be moved toward or away from the guide rail 7 and adjustably secured in a plurality of adjusted positions.

A smaller control bar 20 is likewise channel-shape in cross section and of a length greater than the bar 17 but of a cross sectional size less than the bar 17, is disposed between the bar 17 and the guide rail 7 and is connected to the bar 17 by a plurality of rods, each designated generally 21. Each rod 21 includes two sections pivotally connected in end-to-end relationship, one of which, a shorter section 22 is secured fast to and projects from the back of the bar 20 and the other longer section 23 of which extends reciprocally through an opening in the intermediate portion of the bar 17 and is detachably retained in engagement therewith by a nut 24 which engages the threaded free end of the rod section 23. Each rod 21 carries an expansion coiled spring 25 which urges the bar 20 away from the bar 17 and toward the guide rail 7. As clearly illustrated in Figure 4, the bar sections 22 and 23 are pivotally connected for swinging movement in a plane parallel to the plane of the table 6 and said rods 21 support the control bar 20 slightly above and out of contact with the table 6.

A plurality of arcuate guide fingers 26 are disposed between the control bar 20 and the guide rail 7. The guide fingers 26 are provided at corresponding ends thereof with loops 27 which are disposed between the side flanges of the control bar 20 and swingably supported therein by pivot pins 28 which extend therethrough and through said side flanges. Each of the guide fingers 26 extends from its pivoted or hinged end 28 in a direction toward the discharge end of the table 6 and is bowed outwardly in a direction toward the guide rail 7. The free ends of the fingers 26 each overlap the pivoted end of the next finger 26 and is each provided on its inner side and adjacent its free end with a projection 29 for receiving an end of an expansion spring 30 which bears against the inner side of the free end of said finger 26 and which has an opposite end extending into the channel of the bar 20 and bearing against the base or intermediate portion thereof and supported therein on a projection 31. The finger 26 located adjacent the discharge end of the table 6 is provided with a stop 32 for engagement with a stop element 33 carried by the control bar 20.

From the foregoing it will be readily apparent that the spring fingers 26 will engage each of the pieces of lumber 8 passing longitudinally across the table 6 for holding each of said pieces of lumber in engagement with the guide rail 7 and due to the overlapping relationship of the free ends of the guide fingers 26 with the hinged end of adjacent guide finger, each piece of lumber will at all times be engaged by at least one of the guide fingers while passing along the table 6 so that very narrow pieces of lumber will still be displaced laterally by the fingers 26 into engagement with the guide rail 7. The springs 25 will function to advance the control bar 20 toward the rail 7 when relatively narrow pieces of lumber are passing over the table to insure the maintaining of a proper tension on the spring fingers 26 and the springs 30 of said fingers will individually project the fingers into engagement with the lumber and will permit the fingers to yield individually as a wider piece of lumber moves into contact therewith. Similarly, the wing nuts 19 can be loosened for displacing the master bar 17 toward the guide rail 7 for adjustably positioning the attachment 5 for culls or scrap lumber of different widths.

The master bar 17 is additionally connected to the channel members 12 by links 34 of spring metal which are provided with eyes 35 at each end thereof. The master bar 17 has lugs 36 projecting from the external side of its intermediate portion between pairs of which lugs corresponding eyes 35 of the links 34 are disposed and to which said eyes are pivotally connected by pins 37 which extend therethrough and through the pairs of lugs. The other eyes 35 of the links 34 are disposed in the channel bars 12 and pivotally connected thereto by pivot pins 38 which extend therethrough and through the side flanges of said channel bars 12. Similar resilient links 39 have corresponding eyes 40 disposed between pairs of lugs 41 which project from the external side of the intermediate portion of the control bar 20 and which are connected thereto by pivot pins 42. The eyes 40 at the opposite ends of the links 39 extend into the channel of the master bar 17 and are pivotally connected thereto by pivot pins 43 which extend therethrough and through the side flanges of said master bar 17.

It will thus be readily apparent that the guide unit as a whole is adjustable by moving the master bar 17 relatively to the guide plate 14, that the control bar 20 is yieldably supported by the master bar 17 in a floating support above the table 6 and is spring urged away from the master bar 17 and toward the guide rail 7 and is likewise yieldable against the action of the springs 25 for movement toward the master bar 17. Further, the guide fingers 26 which are carried by the control bar 20 move as a unit with said control bar toward and away from the guide rail 7 and are hingedly supported for swinging movement individually toward and away from the guide rail and are spring urged toward said guide rail and capable of yielding away from the guide rail and toward the control bar, so that each piece of lumber 8 passing lengthwise over the table 6 will be at all times engaged resiliently by a portion of the guide attachment 5 and will be yieldably retained thereby in engagement with the guide rail 7.

A link 44 is pivotally supported on the upper side of the bar 17 and longitudinally thereof by a bracket 45. A shield 46 has a bracket 47 projecting from one side thereof and pivotally connected to the other end of the link 44 so that said shield is pivotally and swingably supported by the link. As seen in Figure 2, bar 17 has an upwardly opening transverse channel 48 adjacent the discharge end of the table 6 to receive and support the shield 46 in an upright position to protect the operator from flying fragments of the pieces 8 cut off by the shaping knives, not shown.

Various modifications and changes are contemplated and may obviously be resorted to, without departing from the spirit or scope of the invention as hereinafter defined by the appended claims.

I claim as my invention:

1. In combination with a molding machine including a table surface over which pieces of scrap lumber are adapted to be conveyed and having a guide rail along one longitudinal edge thereof rising from the table for engagement by the scrap pieces of lumber; an adjustable guide attachment having guide plates disposed above the table surface and transversely thereof and detachably secured in fixed positions thereto, a master bar of channel-shaped cross section disposed on the table and longitudinally thereof and opening in a direction toward the guide rail, means adjustably clamping said master bar to said guide plates for adjustably displacing the bar toward and away from the guide rail, a control bar of channel-shape cross section disposed longitudinally of the table between the master bar and guide rail and opening toward said guide rail, means slidably engaging the master bar and connected to the control bar for supporting the control bar on the master bar, spring means carried by said aforementioned means urging the control bar away from the master bar and toward the guide rail, a plurality of spring fingers having corresponding ends swingably connected to the control bar and extending therefrom in a direction generally toward the guide rail and having free end portions normally disposed substantially parallel to the guide rail and extending generally toward the discharge end of the table, spring means interposed between the free ends of said spring fingers and the control bar urging said free ends toward the guard rail, and said free ends of the spring fingers being adapted to engage pieces of lumber passing over the table top for displacing the pieces of lumber laterally against the guard rail.

2. A guide attachment as in claim 1, said spring fingers being disposed in partially overlapping relationship whereby each of a number of pieces of lumber passing between the guard rail and guide attachment will be engaged at all times by at least one of said spring fingers.

3. A guide attachment as in claim 1, and a plurality of flexible links disposed obliquely to the master bar and control bar, each of said links having one end pivotally connected to the master bar and an opposite end pivotally connected to the control bar.

4. In combination with a molding machine including a table surface over which pieces of scrap lumber are adapted to be conveyed and having a guide rail along one longitudinal edge thereof rising from the table for engagement by the pieces of scrap lumber; an adjustable guide attachment having guide plates disposed above the table surface transversely thereof and detachably secured thereto, a master bar disposed on the table and longitudinally thereof, means adjustably clamping said master bar to said guide plates for adjustably displacing the master bar toward and away from the guide rail, a control bar disposed on the table longitudinally thereof between the master bar and guide rail, means slidably engaging the master bar and secured to the control bar for supporting the control bar on the master bar, spring means mounted on said aforementioned means urging the control bar toward the guide rail, a plurality of spring fingers having corresponding ends connected to the control bar and extending therefrom in a direction generally toward the guide rail and having free end portions normally disposed substantially parallel to the guide rail, extending generally toward the discharge end of the table and yieldably urged toward the guide rail, said free ends of the spring fingers engaging the pieces of lumber passing over the table top for displacing said pieces laterally toward and against the guide rail.

5. An adjustable guide attachment as in claim 4, and link means pivotally connected to the control bar and master bar and disposed obliquely thereto.

BURTON B. GRAHAM.

REFERENCES CITED

The following references are of record in the file of this patent:

UNITED STATES PATENTS

| Number | Name | Date |
|---|---|---|
| 475,782 | Luger | May 31, 1892 |
| 481,983 | Thom | Sept. 6, 1892 |
| 1,022,176 | Boothby | Apr. 2, 1912 |
| 1,322,528 | Brokaw et al. | Nov. 25, 1919 |